(12) United States Patent
Dimitrov

(10) Patent No.: US 12,739,018 B2
(45) Date of Patent: Sep. 15, 2026

(54) METHOD FOR RECEIVING TWO DIGITAL SIGNALS IN A DUAL-POLARIZATION DIGITAL COMMUNICATION SYSTEM

(71) Applicant: Deutsches Zentrum für Luft- und Raumfahrt e.V., Bonn (DE)

(72) Inventor: Svilen Dimitrov, Munich (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 67 days.

(21) Appl. No.: 18/841,004

(22) PCT Filed: Feb. 14, 2023

(86) PCT No.: PCT/EP2023/053635

§ 371 (c)(1),
(2) Date: Aug. 23, 2024

(87) PCT Pub. No.: WO2023/161084

PCT Pub. Date: Aug. 31, 2023

(65) Prior Publication Data

US 2025/0167872 A1 May 22, 2025

(30) Foreign Application Priority Data

Feb. 24, 2022 (DE) ..................... 10 2022 104 457.2

(51) Int. Cl.
*H04B 7/10* (2017.01)
*H04B 1/16* (2006.01)

(52) U.S. Cl.
CPC ................. *H04B 7/10* (2013.01); *H04B 1/16* (2013.01)

(58) Field of Classification Search
CPC ........................................................ H04B 7/10
(Continued)

(56) References Cited

U.S. PATENT DOCUMENTS 10,079,634 B2 9/2018 Khlebnikov et al.
11,526,453 B1 * 12/2022 Mazumder ................ G06F 1/10
(Continued)

FOREIGN PATENT DOCUMENTS

EP 1365519 B1 12/2005
EP 1940061 A1 7/2008

OTHER PUBLICATIONS

CCSDS, “Flexible Advanced Coding and Modulation Scheme for High Rate Telemetry Applications”, Recommendation for Space Data System Standards, Blue Book, Feb. 2023, CCSDS 131.2-B-2.
(Continued)

*Primary Examiner* — Lihong Yu
(74) *Attorney, Agent, or Firm* — The Webb Law Firm

(57) ABSTRACT

The method for receiving two digital signals in a dual-polarization digital communication system includes
receiving the two digital signals transmitted via the two radio-frequency (RF) polarization channels. Each of the two received digital signals includes a stream of oversampled and pulse-shaped baseband digital complex-valued samples. Each of the two received digital signals also includes a cross-polarization interference (XPI) component,
jointly processing the two received digital signals for providing estimation and cancellation of the cross-polarization interference (XPI) components. Processing includes
estimation of the cross factor, and
estimation of each interfering component by means of the estimated cross factor and subtraction of each estimated interfering component from the corresponding received signal.

8 Claims, 11 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2004/0071103 | A1* | 4/2004 | Henttu ................. | H04B 1/7105 370/320 |
| 2004/0128578 | A1* | 7/2004 | Jonnalagadda ....... | H04J 3/0691 713/400 |
| 2009/0086862 | A1 | 4/2009 | Thesling et al. | |
| 2019/0245718 | A1* | 8/2019 | Jana .................. | H04L 25/03057 |

OTHER PUBLICATIONS

ETSI, Digital Video Broadcasting (DVB); Implementation guidelines for the second generation system for Broadcasting, Interactive Services, News Gathering and other broadband satellite applications; Part 2: S2 Extensions (DVB-S2X), ETSI TR 102 376-2, Nov. 2015, v1.1.1.
ITU-R, "Propagation data and prediction methods required for the design of Earth-space telecommunication systems", Recommendation ITU-R p. 618-12, Jul. 2015, P Series, Radiowave propagation.
Liu, Xiangnan et al., "Research and Implementation of High Data Rate Full Digital XPIC Technique", 15th International Conference on Optical Communications and Networks (ICOCN), 2016.
Millerioux, Jean-Pierre et al., "Preliminary Definition of a High Performance X-Band Transmitter for Microsatellites", The 4S Symposium, 2012.

* cited by examiner

METHOD FOR RECEIVING TWO DIGITAL SIGNALS IN A DUAL-POLARIZATION DIGITAL COMMUNICATION SYSTEM

CROSS-REFERENCE TO RELATED APPLICATIONS

This application is the United States national phase of International Application No. PCT/EP2023/053635 filed Feb. 14, 2023, and claims priority to German Patent Application No. 10 2022 104 457.2 filed Feb. 24, 2022, the disclosures of which are hereby incorporated by reference in their entireties.

BACKGROUND OF THE INVENTION

Field of the Invention

The invention relates to a method for receiving first and second digital signals, comprising first and second independent streams of oversampled and pulse-shaped baseband digital complex-valued samples, in a dual-polarization digital communication system utilizing first and second radio-frequency (RF) polarization channels.

Description of Related Art

The block diagram of a dual-polarization digital communication system with cross-polarization interference (XPI) is presented in FIG. 1. This block diagram can be considered as representative for all types of RF commercial digital communication systems, where data is transmitted over two channels in a polarisation-division multiplexing (PDM) fashion, for example, one channel utilizing a vertical polarization (VP), alternatively a right-hand circular polarization (RHCP), and another channel utilizing a horizontal polarization (HP), alternatively a left-hand circular polarization (LHCP). Notable examples of such communication systems are satellite communications and terrestrial wireless communications. In addition, FIG. 1 describes the forward as well as the return links, where the major differences are related to the data framing and symbol multiplexing, as well as the channel function. In this patent, a generalized representation of the cross-polarization channel impairments is considered.

At the transmitter, the data bits are encoded by a forward error correction (FEC) code to provide protection form the channel impairments in the system. The encoded bits are mapped to symbols from a given constellation according to a modulation format such as, for example, amplitude and phase shift keying (APSK), quadrature amplitude modulation (QAM), etc. The symbols are multiplexed and framed in accordance with the underlying transmission scheme. In the forward link, the following examples for transmission schemes used in commercial communication standards can be given: time-division multiplexing (TDM) and frequency-division multiplexing (FDM), such as orthogonal FDM (OFDM). In the return link, time division multiple access (TDMA), orthogonal frequency division multiple access (OFDMA) or single-carrier frequency division multiple access (SC-FDMA) are generally employed. The signal to be transmitted is then oversampled by a chosen oversampling factor and pulse shaped by means of, for example, a square root raised cosine filter (SRRCF) to ensure signal and spectrum integrity for RF transmission. Next, the signal is passed through a digital-to-analog converter (DAC), upconverted to the carrier frequency and amplified for transmission over one of the orthogonal polarizations of an RF antenna.

Each transmitted signal is passed through an RF channel with XPI, including effects such as: depolarization due to atmospheric conditions and cross-polarization discrimination (XPD) of the antennas at the transmitter and the receiver, as well as memory effects due to frequency selectivity of the XPD [1][2]. The XPD depends on the following contributions [1]: the XPD of the transmitter antenna, the hydrometeor-induced cross-polarization in the atmospheric propagation channel [3], and the XPD of the receiver antenna. The XPI in satellite links for Earth observation [1][2] is dependent on the elevation of the satellite, and a cumulative XPD of down to 17 dB is considered for Ka-band links [1].

At the receiver, the signals on the two polarizations are acquired by an RF antenna, and they are distorted by additive white Gaussian noise (AWGN). In the following receiver blocks, each signal is amplified by means of a low-noise amplifier (LNA), down-converted to baseband, and passed through an analog-to-digital converter (ADC). After synchronization, a matched SRRCF is applied. After downsampling, the received symbols are produced which are then demultiplexed, demapped and decoded, to obtain the received bits.

The block diagram of a generalized XPI model is presented in FIG. 2. Since the XPI effects are linear distortions, without loss of generality, they can be cumulatively described by means of the oversampled baseband complex-valued impulse responses of the intended and interfering paths. The oversampled and pulse-shaped baseband signal vector $x_1$ of the intended path of the first polarization is convolved with the oversampled baseband impulse response vector $h_1$ with channel taps of the intended path of the first polarization. The oversampled and pulse-shaped baseband signal vector $x_2$ of the interfering path of the second polarization produces the XPI. This signal is first multiplied by a complex-valued cross factor $\gamma_{21}$ including effects in phase, resulting from depolarization, and amplitude, inversely proportional to the XPD. The signal is then convolved with the oversampled baseband impulse response vector $h_{21}$ with channel taps of the interfering path of the second polarization. Finally, the result is added to the signal of the intended path of the first polarization to produce the output signal of the first polarization. Equivalent operations are performed on the signal of the intended path of the second polarization. As a result, the oversampled baseband received signals at the input of the synchronization and matched filtering block can be expressed as follows:

$$y_1 = h_1 * x_1 + \gamma_{21} \cdot h_{21} * x_2 + n_1, \tag{1}$$

$$y_2 = h_2 * x_2 + \gamma_{12} \cdot h_{12} * x_1 + n_2, \tag{2}$$

where * is the linear convolution operator, and $n_1$ and $n_2$ are independent AWGN components. When using two independent voltage-controlled oscillators (VCOs) for the downconversion of the two channels, differential frequency offset (DFO) between the two received signals can be introduced due to VCO instabilities. For a standard system without an XPI compensation block, the DFO is compensated in the synchronization block. However, as the DFO modifies the information of the XPI contained in each channel, it needs to be considered in the design of XPI compensation techniques.

The XPI is a distortion which degrades the signal-to-noise ratio (SNR) at the receiver, and reduces the achievable data rates. The interfering component is correlated with the signal of the other polarization, and as a result, the distribution of the interference is dependent on the distribution of the other signal. For example, as opposed to the signals in terrestrial wireless communications utilizing OFDM transmission which are known to follow a Gaussian distribution, satellite communication signals often utilize single-carrier TDM transmission, where the signal distribution is dependent on the used modulation format. In satellite communication systems, utilizing the extended second-generation digital video broadcasting via satellite (DVB-S2X) [1] or the consultative committee for space data systems (CCSDS) [2] standards, the XPI is viewed as a superposition of the interfering modulation format on top of the constellation points of the intended modulation format. Therefore, the XPI poses a further challenge for the receiver decoder of the intended path in communication systems, where the transmitted signals do not have a Gaussian distribution, and the XPI does not only introduce a further AWGN component, but also modifies the received constellation, leading to additional performance degradation. In state-of-the-art satellite systems, adaptive coding and modulation (ACM) [1][2] is employed to adjust the modulation format according to the SNR conditions, and, as a simplification, the XPI is treated as a further AWGN component as part of the resulting signal-to-noise-and-interference ratio (SNIR) used as a threshold. A high XPI, therefore, is a limiting factor for the application of higher-order modulation formats and the achievable link throughput.

The state of the art of digital PDM communication systems with XPI has already been described in Section 1. The following items summarize their functionality.

- The system contains one or multiple dual-polarization transmitters, alternatively one or multiple pairs of two single-polarization transmitters.
- The system consists of one or multiple dual-polarization receivers.
- The system is a forward or a return link.
- The transmitter simultaneously transmits data on two orthogonal polarizations, for example, VP and HP or RHCP and LHCP. Alternatively, a pair of transmitters simultaneously transmit data on two orthogonal polarizations, for example, one uses VP or RHCP, and the other uses HP or LHCP, respectively. The dual-polarization transmitter or the pair of two single-polarization transmitters use independent processing chains for the two polarizations.
- The receiver simultaneously receives data on two orthogonal polarizations, for example, VP and HP or RHCP and LHCP. The dual-polarization receiver uses independent processing chains for the two polarizations.
- The XPI in the system is introduced by the following: the XPD of the transmitter antenna, the hydrometeor-induced cross-polarization in the atmospheric propagation channel, and the XPD of the receiver antenna.
- The receiver in the system introduces AWGN.
- The receiver performs ACM to adapt the transmission rates to the XPI and channel conditions.
  - The XPI and the AWGN reduce the probability of successful received signal detection, and as a result, bit errors occur.

Proprietary solutions have been developed to compensate the XPI at the receiver. They are based on an adaptive filter architecture with access to the signals on both polarizations prior to the symbol demapping and decoding stages. Using this structure, an XPI cancellation (XPIC) method has been described in [4]. It can be applied on the signals of both polarizations either in a symbol-spaced or a fractionally-spaced fashion. The adaptive filters for the intended and interfering paths are trained to generate signals used for the interference cancellation. In the basic form, the training of the filters is decision-directed, it is blind and without prior knowledge of the transmitted symbols, however the used modulation format is required to be known at the receiver. It can be further improved in a data-aided fashion by means of known pilot signals. A closely related cross-polarization digital equalization and automatic filtering (XDEAF) method has been presented in [5].

In [4], it is stated that this approach requires synchronous frequency downconversion of the two channels. As a result, it is unclear whether this approach, as well as the XDEAF method, can be applied in the presence of DFO. An extension to the XPIC method for operation in scenarios where there is a DFO between the two channels is presented in [4][6], including additional components at the expense of higher complexity.

Simultaneous PDM transmission on two orthogonal polarizations has the potential to double the data throughput in a state-of-the-art communication system. However, the increased XPI between the two channels reduces the SNIR at the receiver, and degrades the performance of the decoder. In state-of-the-art satellite systems for Earth observation [1][2], ACM is employed to adjust the modulation format according to the SNIR conditions during the satellite visibility window. A low XPD, however, is a limiting factor for the application of higher-order modulation formats and, therefore, the data throughput. Proprietary solutions have been developed to compensate the XPI at the receiver, such as XPIC [4], XDEAF [5], and a modified receiver with XPIC [4][6]. They are based on an adaptive filter architecture with access to the signals on both polarizations prior to the symbol demapping and decoding stages either in a symbol-spaced or a fractionally-spaced fashion. While these approaches reduce the XPI, they also increase the computational complexity of the receiver, due to the required training and XPI cancellation with multiple coefficients, which can be a constraint for the implementation in high-rate hardware devices and applications. In addition, the XPIC method requires a synchronous frequency downconversion of the two channels which is a further complication for the receiver design.

SUMMARY OF THE INVENTION

According to the invention, a new digital XPI compensation method, called XPI Correlation Learning Estimation and Adaptive Reduction (XPI-CLEAR), is described, including a practical method for high-speed implementation in an FPGA device as part of an improved dual-channel digital receiver device. Having access to the signals on both channels, this non-data-aided and non-decision-directed method according to the invention adaptively estimates the XPI, and performs XPI cancellation in a transparent fashion. The XPI-CLEAR method of the invention can be applied in receivers with independent frequency downconversion blocks for the two channels, and it can operate in the presence of DFO between the received signals. It has a lower complexity as compared to the filter-based approaches, and is therefore suitable for higher-rate applications. As a result, the SNIR at the receiver decoder is increased and the achievable data rates improved.

The digital XPI-CLEAR method of the invention is applied on the oversampled samples of the signals on both polarizations directly after the ADC stages. It exploits the correlation between the two received signals for the adaptive estimation and cancellation of the XPI, and it is therefore structurally different from the approaches based on adaptive filtering. In addition, the XPI-CLEAR method can operate in the presence of DFO between the two channels. Moreover, the XPI-CLEAR method is fully blind, transparent and signal-agnostic. It is not decision-directed and also not data-aided. It has a lower complexity as compared to the filter-based approaches, and is therefore suitable for higher-rate applications.

According to the invention, the method for receiving first and second digital signals, comprising first and second independent streams of oversampled and pulse-shaped baseband digital complex-valued samples, in a dual-polarization digital communication system utilizing first and second RF polarization channels, comprises

- receiving the two digital signals transmitted via the two RF polarization channels, wherein each of the two received digital signals comprises a stream of oversampled and pulse-shaped baseband digital complex-valued samples, and wherein each of the two received digital signals also includes an XPI component,
- jointly processing the two received digital signals for providing estimation and cancellation of the XPI components,
- wherein processing comprises estimation of the cross factor, and
- wherein processing further comprises estimation of each interfering component by means of the estimated cross factor and subtraction of each estimated interfering component from the corresponding received signal.

The method can be applied in a dual-channel receiver device for any digital communication system both for forward and return links.

In a first variant of the invention, the processing step further comprises buffering the received samples of the first and second channels, in order to construct first and second vectors of consecutive samples of the first and second digital signals, respectively, with the two vectors having the equal even-number length, wherein the length is the number of consecutive samples.

In a second variant of the invention, the processing step further comprises the following clock signals:

- a main clock signal, determining the fundamental frequency of the processing,
- an odd clock signal, being half the frequency of the main clock signal, having its rising edge synchronous with the rising edge of the main clock signal, and
- an even clock signal, being a shifted version of the odd clock signal, having its rising edge synchronous with the falling edge of the main clock signal.

According to the second variant of the invention, the processing step may further comprise sequentially feeding the received samples of the first and second channels into first and second shift registers with equal even-number length, wherein each shift register comprises delay elements, wherein the length is the number of delay elements, and wherein the shift registers are driven by the main clock signal.

As a further embodiment of the first and second variants of the invention, the step of estimation of the cross factor further comprises inputting the oversampling factor used during sampling of the two received signals, and using it to compute the sampling correction factor by means of interpolation or extrapolation with the look-up table (LUT) in Table 1.

In an embodiment of the first variant of the invention, the step of estimation of the cross factor further comprises the following steps:

- computing the dot product between the elements of the first vector and the complex conjugate of the elements of the second vector, and normalizing the result by the even-number length of the first vector,
- using the first vector to compute the dot product between the elements with an odd index and the complex conjugate of the elements with an even index, and normalizing the result by the half value of the even-number length of the first vector,
- using the second vector to compute the dot product between the elements with an odd index and the complex conjugate of the elements with an even index, and normalizing the result by the half value of the even-number length of the first vector,
- taking the real value of the results of the latter two dot product operations, involving the odd and even elements of each vector, multiplying each of them by the sampling correction factor, and adding the results together,
- computing the reciprocal value of the result of the latter addition by means of the LUT of the reciprocal function, wherein the reciprocal function is defined as 1 divided by the argument of the function, and multiplying it with the result of the first dot product operation, involving the elements of the first and second vectors,
- taking the real and imaginary values of the result of the latter multiplication, applying the LUT for the function in equation (3) on each of them, and respectively combining the two results to form a complex-valued number, being the estimate of the cross factor.

In an embodiment of the second variant of the invention, the step of estimation of the cross factor further comprises the following steps:

- multiplying the output of the first delay element of the first shift register with the complex conjugate of the output of the first delay element of the second shift register, multiplying the output of the last delay element of the first shift register with the complex conjugate of the output of the last delay element of the second shift register, subtracting the result of the latter multiplication from the result of the former multiplication, adding the result to the output of a first single-element shift register, serving as an accumulator, being driven by the main clock signal, and having the result input to the first single-element shift register,
- sequentially feeding the received samples of the first channel into a first half-length shift register with length of half the value of the even-number length of the first shift register, wherein the first half-length shift register is driven by the odd clock signal, and sequentially feeding the received samples of the first channel into a second half-length shift register with length of half the value of the even-number length of the first shift register, wherein the second half-length shift register is driven by the even clock signal, multiplying the output of the first delay element of the first half-length shift register with the complex conjugate of the output of the first delay element of the second half-length shift register, multiplying the output of the last delay element of the first half-length shift register with the complex conjugate of the output of the last delay element of the second half-length shift register, subtracting the result of the latter multiplication from the result of the former multiplication, adding the result to the output of a second single-element shift register, serving as an accumulator, being driven by the even clock signal, and having the result input to the second single-element shift register, sequentially feeding the received samples of the second channel into a third half-length shift register with length of half the value of the even-number length of the first shift register, wherein the third half-length shift register is driven by the odd clock signal, and sequentially feeding the received samples of the second channel into a forth half-length shift register with length of half the value of the even-number length of the first shift register, wherein the forth half-length shift register is driven by the even clock signal, multiplying the output of the first delay element of the third half-length shift register with the complex conjugate of the output of the first delay element of the forth half-length shift register, multiplying the output of the last delay element of the third half-length shift register with the complex conjugate of the output of the last delay element of the forth half-length shift register, subtracting the result of the latter multiplication from the result of the former multiplication, adding the result to the output of a third single-element shift register, serving as an accumulator, being driven by the even clock signal, and having the result input to the third single-element shift register, taking the real values of the outputs of the second and third single-element shift registers, multiplying each of them with the sampling correction factor and with the constant from equation (4), and adding the two results together, computing the reciprocal value of the result of the latter addition by means of the LUT of the reciprocal function, wherein the reciprocal function is defined as 1 divided by the argument of the function, and multiplying it with the output of the first single-element shift register and with the constant from equation (5), taking the real and imaginary values of the result of the latter multiplication, applying the LUT for the function in equation (3) on each of them, and respectively combining the two results to form a complex-valued number, being the estimate of the cross factor.

In another embodiment of the second variant of the invention, the processing step further comprises initializing all shift registers with zeros at the start of the execution.

In a further embodiment of the first variant of the invention, the step of estimation of each cross-polarization interference component and its subtraction of the received signal comprises the following steps:

multiplying the estimate of the cross factor with the samples of the second vector, and elementwise subtracting the result from the samples of the first vector, producing improved received samples of the first channel, multiplying the conjugated estimate of the cross factor with the samples of the first vector, and elementwise subtracting the result from the samples of the second vector, producing improved received samples of the second channel.

In a further embodiment of the second variant of the invention, the step of estimation of each cross-polarization interference component and its subtraction of the received signal further comprises the following steps:

multiplying the estimate of the cross factor with the output of the last delay element of the second shift register, and subtracting the result from the output of the last delay element of the first shift register, producing an improved received sample of the first channel, multiplying the conjugated estimate of the cross factor with the output of the last delay element of the first shift register, and subtracting the result from the output of the last delay element of the second shift register, producing an improved received sample of the second channel.

In still a further embodiment of the second variant of the invention, the processing step further comprises sequentially outputting the improved received samples for the first and second channel, wherein the validity of the improved received samples is determined by a binary output-valid signal, wherein the output-valid signal is initialized as zero, and is set to one, once a counter signal, driven by the main clock signal and initialized as zero reaches a value equal to the even-number length of the first shift register.

BRIEF DESCRIPTION OF THE DRAWING

The present invention will be described hereinbelow in more detail with reference to the drawing in which.

Figures 8A, 8B:
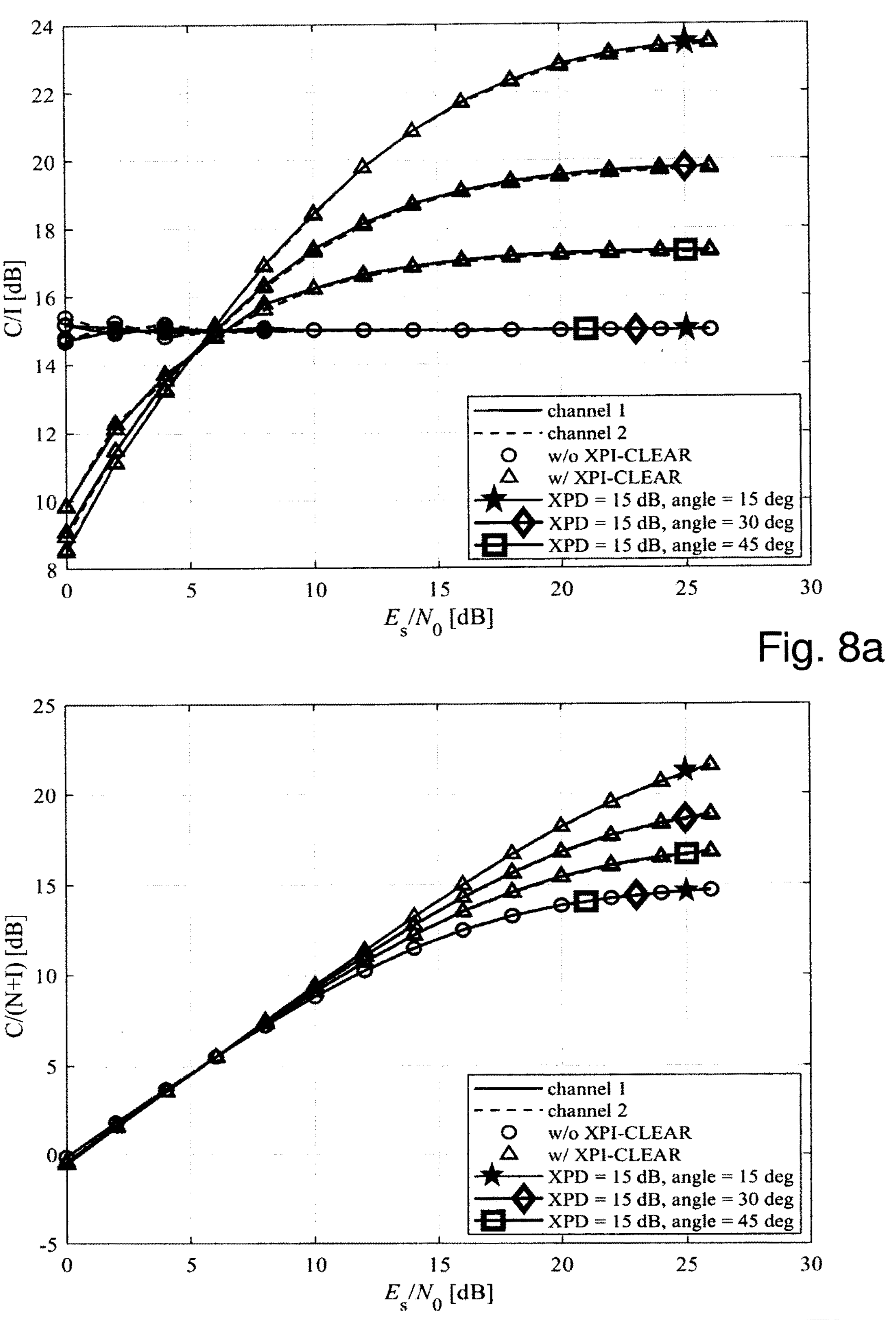
Figures 9A, 9B:
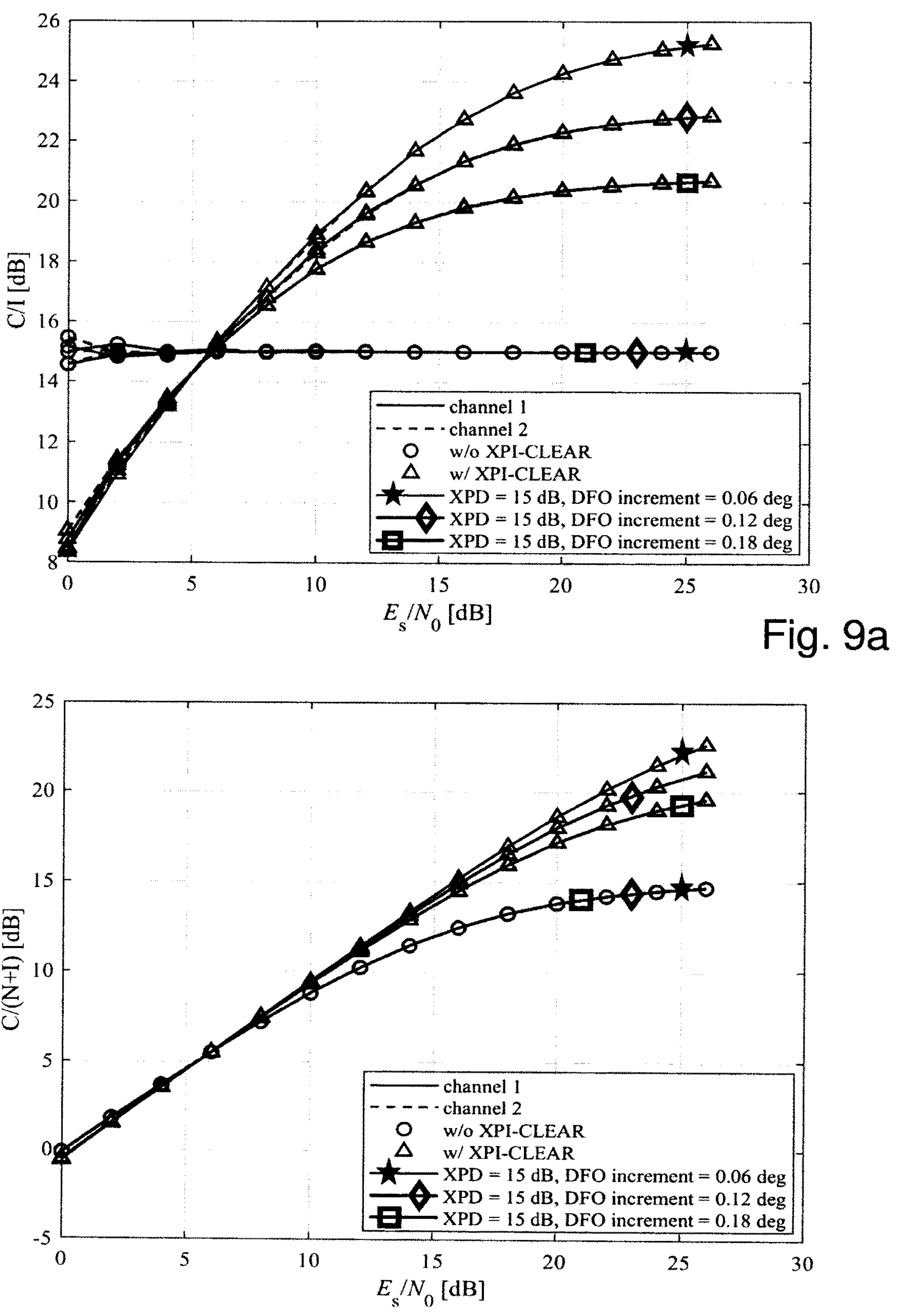
Figures 10A, 10B:
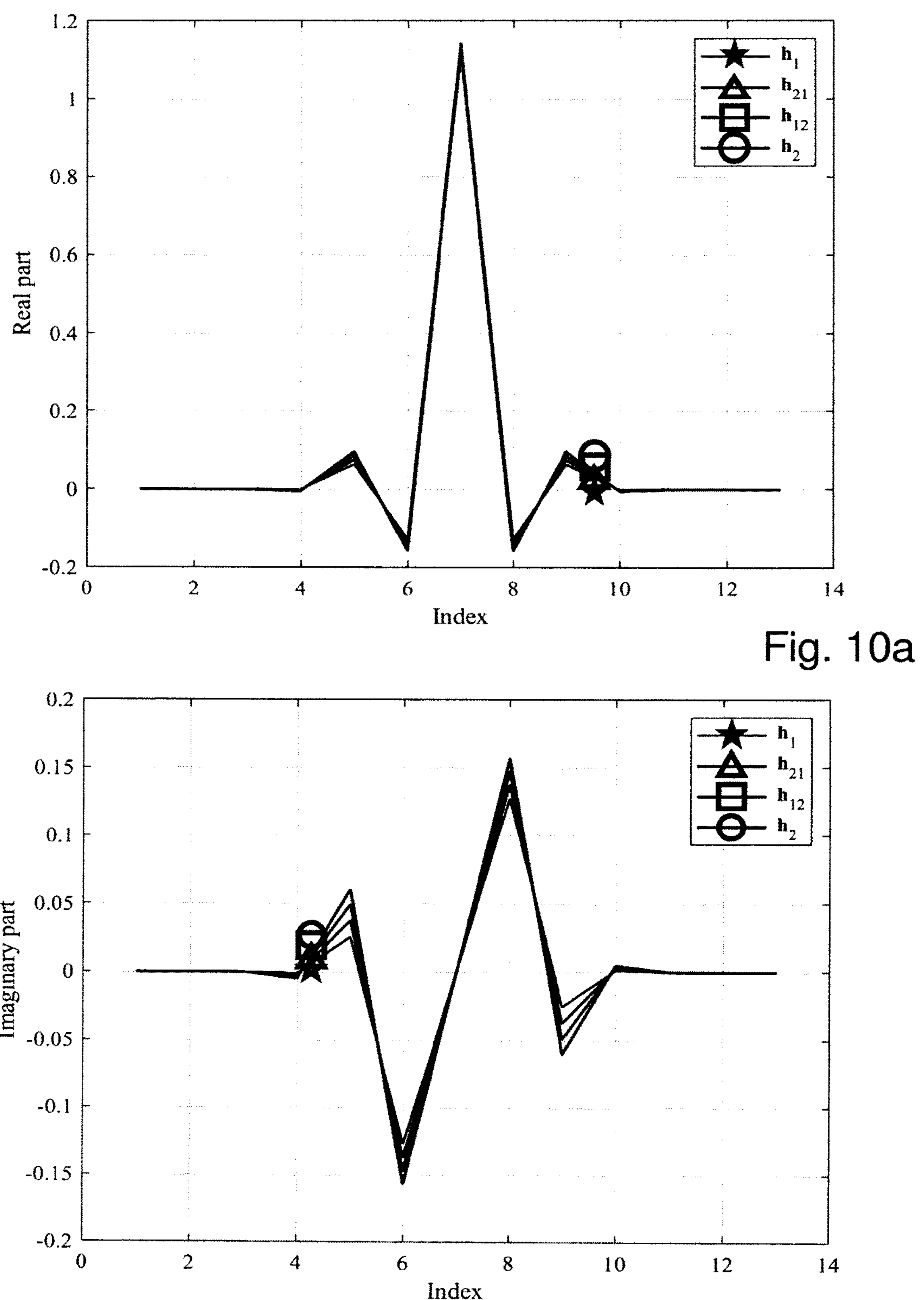
Figures 11A, 11B:
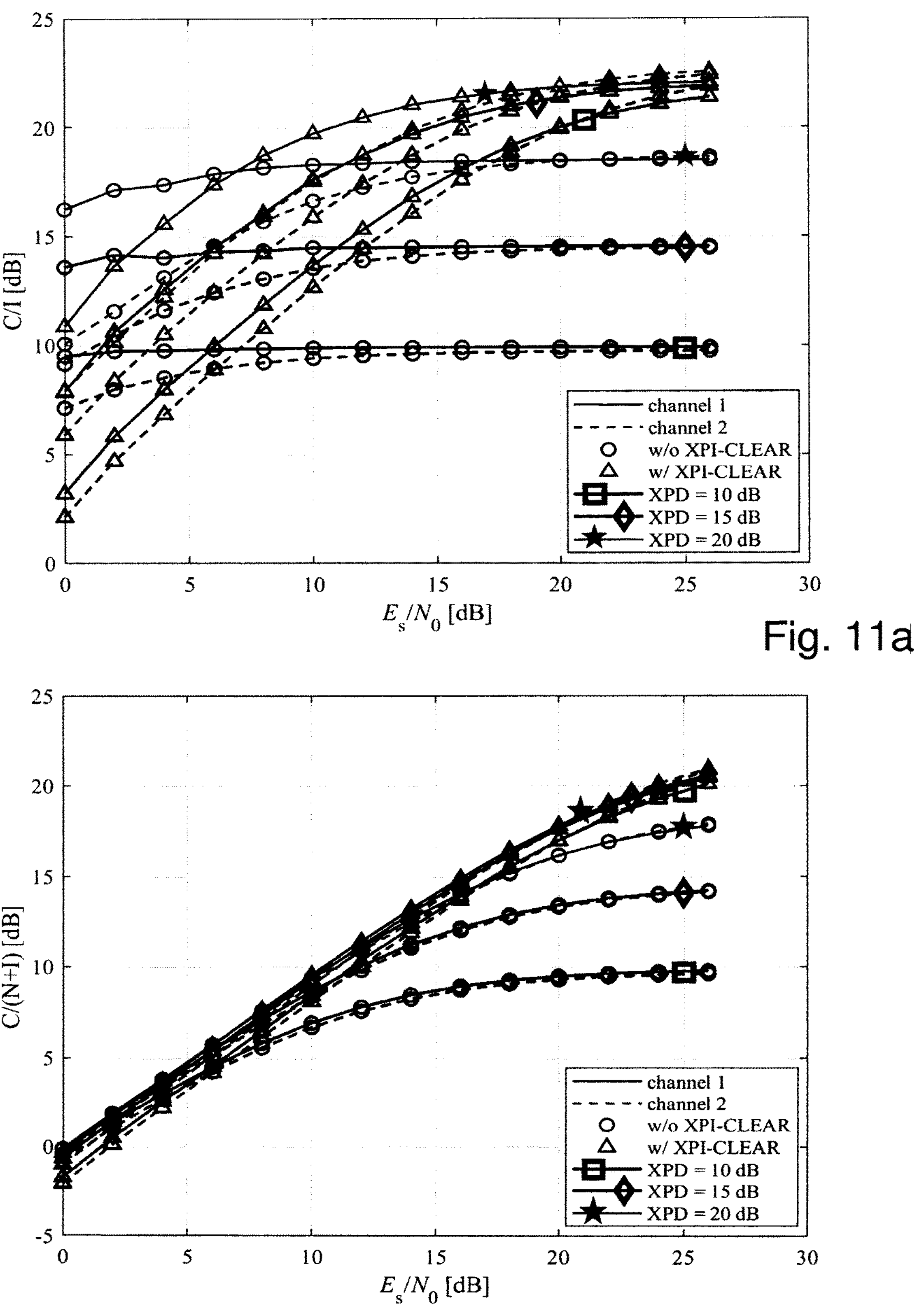

show a comparison of standard and improved receivers for real-valued cross factors and unit impulse responses in the XPI model for XPD values of 10, 15 and 20 dB, FIGS. 8*a*) and *b*)

show a comparison of standard and improved receivers for complex-valued cross factors and unit impulse responses in the XPI model for an XPD of 15 dB and phase angles of 15, 30 and 45 degrees, FIGS. 9*a*) and *b*)

show a comparison of standard and improved receivers for a real-valued cross factor and unit impulse responses in the XPI model for an XPD of 15 dB and a DFO with phase increments of 0.06, 0.12 and 0.18 degrees, FIGS. 10*a*) and *b*)

show the complex-valued FIR impulse response (real part in FIG. 10*a*) and imaginary part in FIG. 10*b*)) in the XPI model, FIGS. 11*a*) and *b*)

show a comparison of standard and improved receivers for real-valued cross factors and for a given example of impulse responses in the XPI model for XPD values of 10, 15 and 20 dB.

DESCRIPTION OF THE INVENTION

Figure 3:
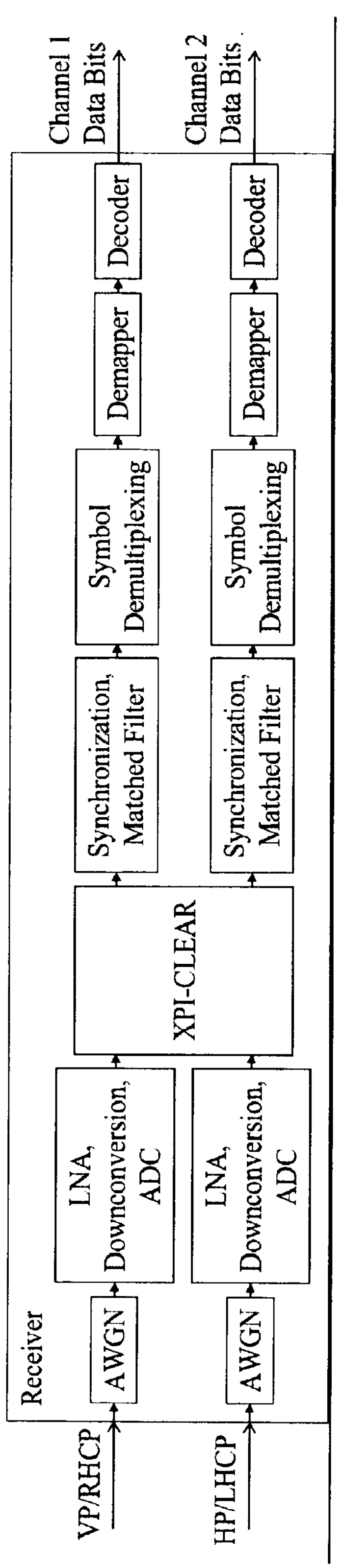
FIG. 3 is a block diagram of the dual-channel receiver device, implementing the XPI-CLEAR method according to the invention.

In the following, a new dual-polarization digital receiver device is described which implements the new XPI compensation method, called XPI-CLEAR, according to the invention. The block diagram of this receiver is presented in FIG. 3. The signals on the two polarizations are received by the antenna, and pick up AWGN. Each signal is amplified by means of an LNA, down-converted to baseband, and passed through an ADC. Having local access to the signals on both channels, the block of the XPI-CLEAR method is input by the oversampled signals of the two polarizations after the ADC stages. Equal path lengths in terms of, for example, cables or copper traces between the receiver antenna and the digital electronics in the two channels are required to avoid differential timing offset between the two signals over this portion of the transmission chain. In addition, two equal synchronous sampling main clocks are assumed to drive the two ADCs, which is readily achievable due to colocation of the digital processing electronics, and sampling rates greater or equal to the Nyquist rate are required, which is a common premise in RF communication systems. In the presence of DFO between the two channels in the case when two independent frequency downconversion blocks are used, the sampling rate has to be sufficiently larger than the Nyquist rate to accommodate the DFO. The XPI-CLEAR block performs estimation and cancellation of the XPI in a transparent fashion, concurrently using the signal samples on both channels. The processed signal samples of the two channels are output and respectively fed to the subsequent receiver stages, preserving all structural signal properties. In the following blocks, the signals of the two channels are subjected to synchronization, matched filtering, downsampling, symbol demultiplexing, demapping and decoding, in order to produce the received data bits.

Figure 4:
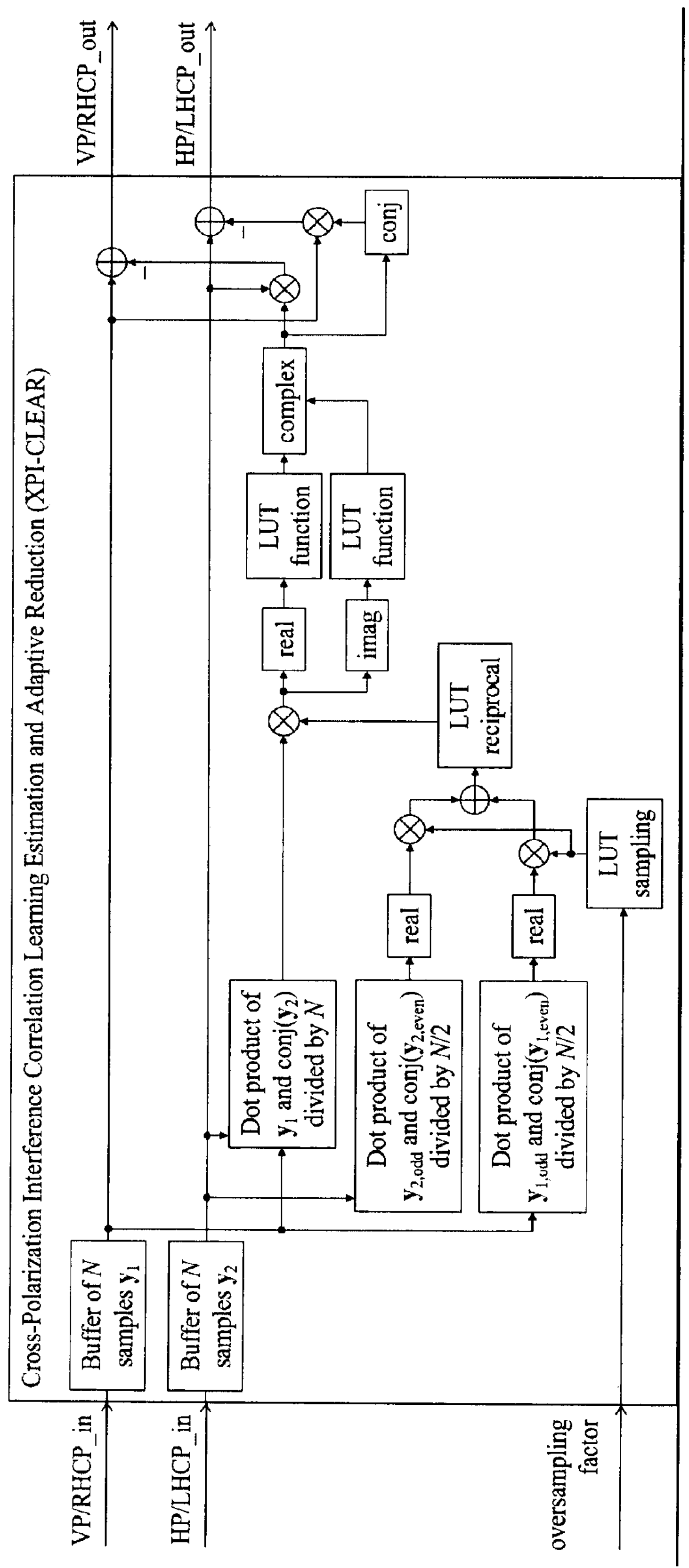
FIG. 4 is a block diagram of the XPI-CLEAR method according to the invention.
Figure 5:
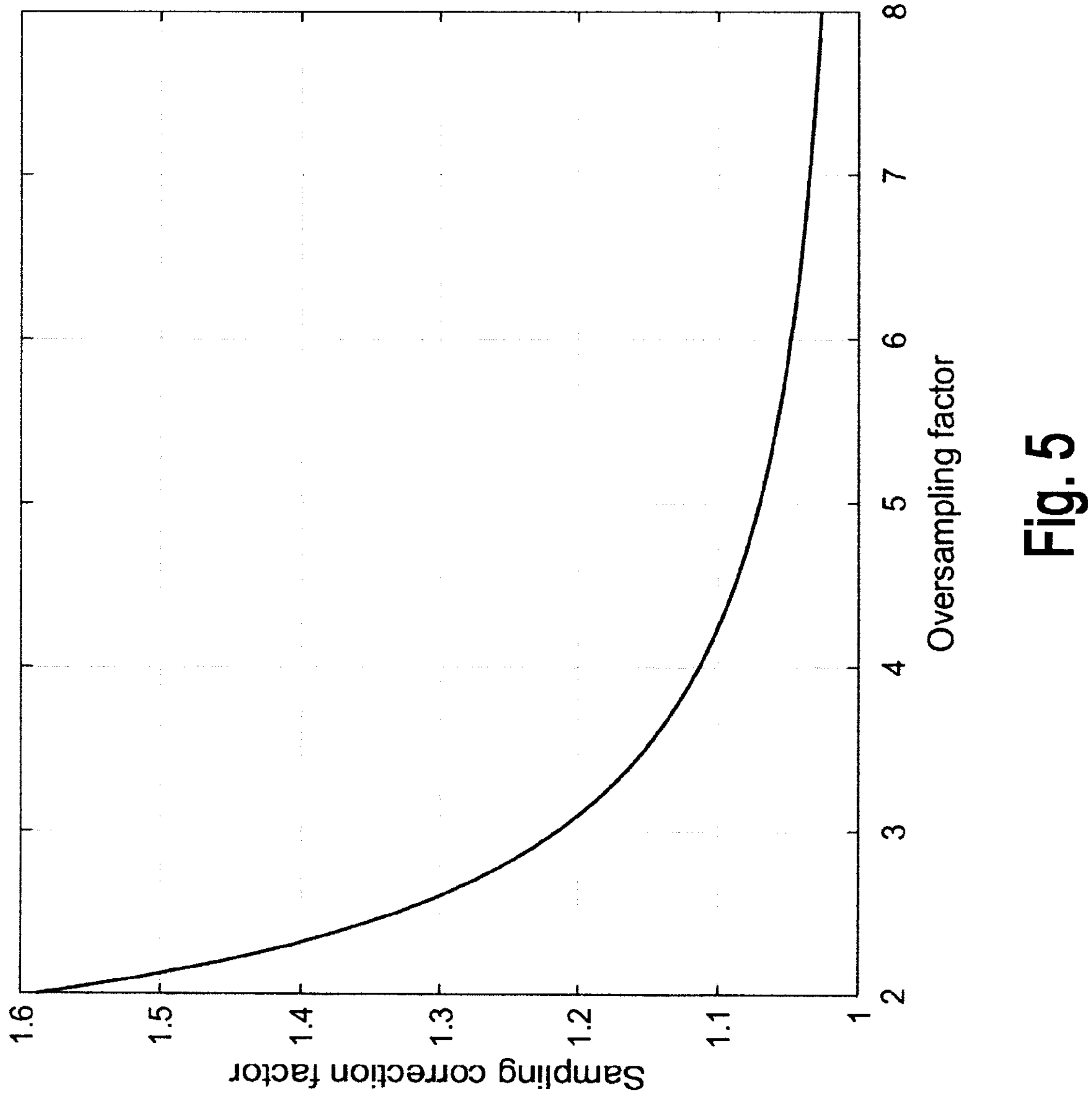
FIG. 5 is a graph of the sampling correction factor as a function of the oversampling factor.

The block diagram of the XPI-CLEAR method is presented in FIG. 4. As input, the XPI-CLEAR block takes the samples of the oversampled signals of the two polarizations. Without loss of generality, complex-valued signals are implied throughout the description, unless otherwise stated, and the separation in in-phase (I) and quadrature (Q) components is considered straightforward. No previous knowledge of the power level or level scaling is required for the signals of the two polarizations. In addition, the oversampling factor used at both ADCs of the two channels is also provided as input. It is a real-valued number greater or equal to 2, and it is used to compute a sampling correction factor. For a TDM transmission with SRRCF pulse shaping with roll-off factors between 5% and 35%, which is the case in the majority of satellite communication standards, the sampling correction factor as a function of the oversampling factor, is depicted in FIG. 5, and the values for the corresponding sampling LUT are presented in Table 1. The sampling correction factor is a real-valued number greater or equal to 1, and it converges to 1 for very large oversampling factors. In general, a LUT can be used in digital electronics to achieve a high-speed implementation of a function. The pairs of values in the LUT can be used to compute the output for a given input according to the nearest input-output pair or by means of interpolation and extrapolation, for example, linear, quadratic, etc. The size of the LUT and the granularity of the quantization, as well as the use of interpolation/extrapolation, determine the trade-off between numerical accuracy and processing speed.

TABLE 1

LUT for the values of the sampling correction factor as a function of the oversampling factor

| Oversampling factor | Sampling correction factor |
|---|---|
| 2 | 1.5885 |
| 2.1 | 1.5153 |
| 2.2 | 1.4562 |
| 2.3 | 1.4068 |
| 2.4 | 1.3667 |
| 2.5 | 1.3309 |
| 2.6 | 1.3009 |
| 2.7 | 1.2750 |
| 2.8 | 1.2525 |
| 2.9 | 1.2328 |
| 3 | 1.2153 |
| 3.1 | 1.1997 |
| 3.2 | 1.1858 |
| 3.3 | 1.1734 |
| 3.4 | 1.1624 |
| 3.5 | 1.1522 |
| 3.6 | 1.1434 |
| 3.7 | 1.1349 |
| 3.8 | 1.1272 |
| 3.9 | 1.1202 |
| 4 | 1.1138 |
| 4.1 | 1.1079 |
| 4.2 | 1.1025 |
| 4.3 | 1.0975 |
| 4.4 | 1.0928 |
| 4.5 | 1.0885 |
| 4.6 | 1.0845 |
| 4.7 | 1.0807 |
| 4.8 | 1.0774 |
| 4.9 | 1.0739 |
| 5 | 1.0709 |
| 5.1 | 1.0680 |
| 5.2 | 1.0653 |
| 5.3 | 1.0627 |
| 5.4 | 1.0603 |
| 5.5 | 1.0581 |
| 5.6 | 1.0559 |
| 5.7 | 1.0539 |
| 5.8 | 1.0520 |
| 5.9 | 1.0502 |
| 6 | 1.0488 |
| 6.1 | 1.0469 |
| 6.2 | 1.0453 |
| 6.3 | 1.0438 |
| 6.4 | 1.0425 |
| 6.5 | 1.0411 |
| 6.6 | 1.0399 |
| 6.7 | 1.0386 |
| 6.8 | 1.0375 |
| 6.9 | 1.0364 |
| 7 | 1.0353 |
| 7.1 | 1.0343 |
| 7.2 | 1.0334 |
| 7.3 | 1.0324 |
| 7.4 | 1.0315 |
| 7.5 | 1.0307 |
| 7.6 | 1.0298 |
| 7.7 | 1.0291 |
| 7.8 | 1.0283 |
| 7.9 | 1.0276 |
| 8 | 1.0269 |

Each signal of the two polarizations VP/RHCP_in and HP/LHCP_in is respectively buffered, in order to construct two vectors of consecutive samples, $y_1$ and $y_2$ with length N, an even number, which are indexed from 1 to N. The elements of the two vectors are used to compute the dot product between the elements of the first vector, $y_1$, and the complex conjugate of the elements of the second vector, conj($y_2$). The result is divided by N. In addition, the elements of the first vector, $y_1$, are also used to compute the dot product between the elements with an odd index, $y_{1,odd}$, and the complex conjugate of the elements with an even index, conj($y_{1,even}$). The result is divided by N/2. The elements of the second vector, $y_2$, are also used to compute the dot product between the elements with an odd index, $y_{2,odd}$, and the complex conjugate of the elements with an even index, conj($y_{2,even}$). The result is also divided by N/2. The real parts of the results of the dot product operations involving the odd and even elements of each vector are taken, then multiplied by the sampling correction factor and added together. The result of the addition is passed through a LUT for the reciprocal function $f(x)=1/x$, and it is then multiplied with the result of the dot product operations involving the elements of the two vectors. The real and imaginary parts of the result are separately passed through a LUT for the function:

$$f(x) = \text{Real}\left\{\frac{1-\sqrt{1-4x^2}}{2x}\right\}. \tag{3}$$

The two results are then respectively combined to form a complex-valued factor. This factor is then multiplied with the samples of the second vector, $y_2$, and the result is elementwise subtracted from the samples in the first vector, $y_1$, to perform the XPI cancellation. The factor is also conjugated, then multiplied with the samples of the first vector, $y_1$, and the result is elementwise subtracted from the samples in the second vector, $y_2$. As a result, the signal samples of the two channels with reduced XPI, VP/RHCP_out and HP/LHCP_out, are produced and provided as the output of the XPI-CLEAR block.

The size of the vectors $y_1$ and $y_2$, N, can be selected sufficiently large to provide AWGN averaging, for example, larger than 200 samples. The upper limit of the vector size can be determined in accordance with the DFO. The DFO, $f_{DFO}$, can be computed as the product of the RF carrier frequency, $f_c$, and the differential sensitivity of the two VCOs in the two channels, $S_{VCO}$, commonly specified in parts per million (ppm), $f_{DFO}=f_c \cdot S_{VCO}$. For example, a DFO of up to 500 KHz can be expected in a Ka-band satellite system for Earth observation using a 25 GHz carrier frequency and a typical differential sensitivity of the VCOs of 20 ppm. When using sampling rates, $f_s$, greater or equal to twice the sum of the symbol rate, $B_s$, and the DFO, which can be setup by means of the oversampling factor, $\eta$, the effect of the DFO can be modelled as an elementwise multiplication of the samples of one of the received signals with an rotating complex exponential with increment of $360 \cdot f_{DFO}/f_s$ in degrees. As a result, the oversampling factor and the sampling rate, $f_s=\eta \cdot B_s$, can be chosen in accordance with the following inequality: $\eta \cdot B_s \geq 2 \cdot (B_s+f_{DFO})$. The upper limit of the vector size can be determined as $0.25 \cdot f_s/f_{DFO}$, and the following inequality can be used as a guideline: $200 \leq N \leq 0.25 \cdot f_s/f_{DFO}$.

Figure 6:
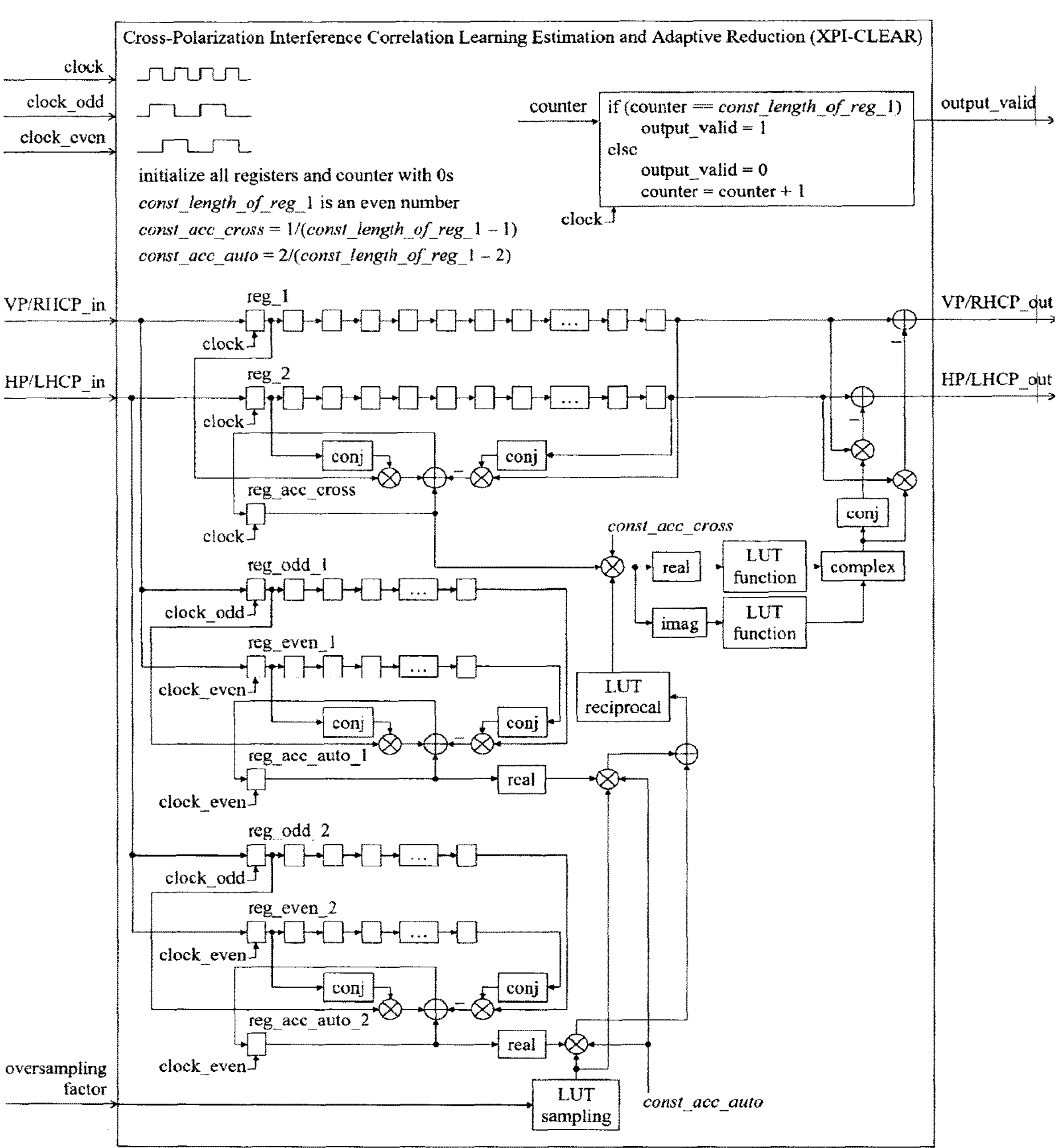
FIG. 6 is a block diagram of the FPGA device, implementing the XPI-CLEAR method of the invention, FIGS. 7*a*) and *b*)

A method for a practical high-speed implementation of the XPI-CLEAR method in an FPGA device as part of an improved dual-channel digital receiver device is also described in this patent. The block diagram of the FPGA device, implementing the XPI-CLEAR method, is presented in FIG. 6. For the sake of a high-speed implementation, all the signals are represented in terms of fixed-point precision numbers. Without loss of generality, complex-valued signals are implied throughout the description, unless otherwise stated, and the separation in I and Q components is considered straightforward.

As control input, the XPI-CLEAR block takes three binary signals which are used for the control of the operations. The main clock signal determines the fundamental frequency of the processing. The clock_odd signal is half the frequency (or twice the period) of the main clock signal, and its rising edge is synchronous with the rising edge of the main clock signal. The clock_even signal is a shifted version of the clock_odd signal, in a way that its rising edge is synchronous with the falling edge of the main clock signal. At the start of the execution, all registers and counters are initialized with zeros.

As data input, the XPI-CLEAR block takes the samples of the oversampled signals of the two polarizations. Each signal VP/RHCP_in and HP/LHCP_in is respectively fed into a shift register, reg_1 and reg_2, one sample after the other in accordance with the main clock signal. No previous knowledge of the power level or level scaling is required for the signals of the two polarizations, except for the adjustment of the fixed-point precision format in terms of word length and fraction length, required in FPGA implementations. The length of the shift registers reg_1 and reg_2 is given by the constant const_length_of_reg_1 which is an even number, and the indices of the delay elements are given as 1 to const_length_of_reg_1 from left to right. The output of the first delay element of reg_1 is multiplied with the complex conjugate of the output of the first delay element of reg_2. The output of the last delay element of reg_1 is multiplied with the complex conjugate of the output of the last delay element of reg_2. The result of the latter multiplication is subtracted from the result of the former multiplication, and the result is added to the output of a single-element shift register reg_acc_cross, driven by the main clock signal. The result is then input to the reg_acc_cross register, which serves as an accumulator.

The samples of the first polarization VP/RHCP are also fed into a shift register reg_odd_1, driven by the clock_odd signal, and into a shift register reg_even_1, driven by the clock_even signal. The length of the shift registers reg_odd_1 and reg_even_1 is given by half of the value of the constant const_length_of_reg_1. The output of the first delay element of reg_odd_1 is multiplied with the complex conjugate of the output of the first delay element of reg_even_1. The output of the last delay element of reg_odd_1 is multiplied with the complex conjugate of the output of the last delay element of reg_even_1. The result of the latter multiplication is subtracted from the result of the former multiplication, and the result is added to the output of a single-element shift register reg_acc_auto_1, driven by the clock_even signal. The result is then input to the reg_acc_auto_1 register, which serves as an accumulator.

Similarly, the samples of the second polarization HP/LHCP are also fed into a shift register reg_odd_2, driven by the clock_odd signal, and into a shift register reg_even_2, driven by the clock_even signal. The length of the shift registers reg_odd_2 and reg_even_2 is given by half of the value of the constant const_length_of_reg_1. The output of the first delay element of reg_odd_2 is multiplied with the complex conjugate of the output of the first delay element of reg_even_2. The output of the last delay element of reg_odd_2 is multiplied with the complex conjugate of the output of the last delay element of reg_even_2. The result of the latter multiplication is subtracted from the result of the former multiplication, and the result is added to the output of a single-element shift register reg_acc_auto_2, driven by the clock_even signal. The result is then input to the reg_acc_auto_2 register, which serves as an accumulator.

In addition, the oversampling factor used at both ADCs of the two channels is also provided as input to the XPI-CLEAR block. It is a real-valued number greater or equal to 2, and it is input to the sampling LUT from Table 1. As output of the sampling LUT, the real-valued sampling correction factor is input in a three-way multiplication with the real part of the output of reg_acc_auto_1 and with the constant:

$$\text{const\_acc\_auto} = 2/(\text{const\_length\_of\_reg\_1} - 2). \tag{4}$$

The sampling correction factor is also input in a three-way multiplication with the real part of the output of reg_acc_auto_2 and with the constant const_acc_auto. The results of these two multiplications are added together, and the result is passed through a LUT for the reciprocal function $f(x)=1/x$. The output of the reciprocal LUT is input in a three-way multiplication with the output of reg_acc_cross and with the constant:

$$\text{const\_acc\_cross} = 1/(\text{const\_length\_of\_reg\_1} - 1). \tag{5}$$

The real and imaginary parts of the result are separately passed through a LUT for the function from equation (3). The two results are then respectively combined to form a complex-valued factor. This factor is then multiplied with the output of the last delay element of reg_2, and the result is subtracted from the output of the last delay element of reg_1, to perform the XPI cancellation. The factor is also conjugated, then multiplied with the output of the last delay element of reg_1, and the result is subtracted from the output of the last delay element of reg_2. As a result, the signal samples of the two channels with reduced XPI, VP/RHCP_out and HP/LHCP_out, are respectively produced and provided as the output of the XPI-CLEAR block. These samples are streamed sequentially, and are valid after a processing delay. This validity is determined by the binary output_valid signal, provided as output of the XPI-CLEAR block. The output_valid signal is initialized as zero (false), and it is set to one (true), once the counter signal, driven by the main clock signal, reaches a value equal to const_length_of_reg_1.

The performance benefits of the XPI-CLEAR method according to the invention and the improved receiver in this invention have been evaluated by means of a Monte Carlo simulation of a satellite downlink transmission using PDM on two orthogonal polarizations, LHCP and RHCP, at a carrier frequency of 25 GHz in Ka band. For the data transmission in each of the two channels, a single-carrier TDM scheme according to the DVB-S2X standard [1] is employed. A carrier symbol rate of 250 MBaud with a carrier roll-off of 20% is used in the setup in conjunction with an oversampling factor of 4, resulting in a sample rate of 1 Gsps. A signal waveform consisting of 100 physical layer (PL) frames is employed in each channel, where each PL frame consists of 10800 data symbols from a 16-APSK modulation format according to a 4/5-rate LDPC code. For the operation of the XPI-CLEAR method, the vector length is setup to N=500. While an XPD of 17 dB can be expected in Ka band [1], the performance of the new method and the improved receiver is evaluated for XPD values down to 10 dB.

Figures 7A, 7B:
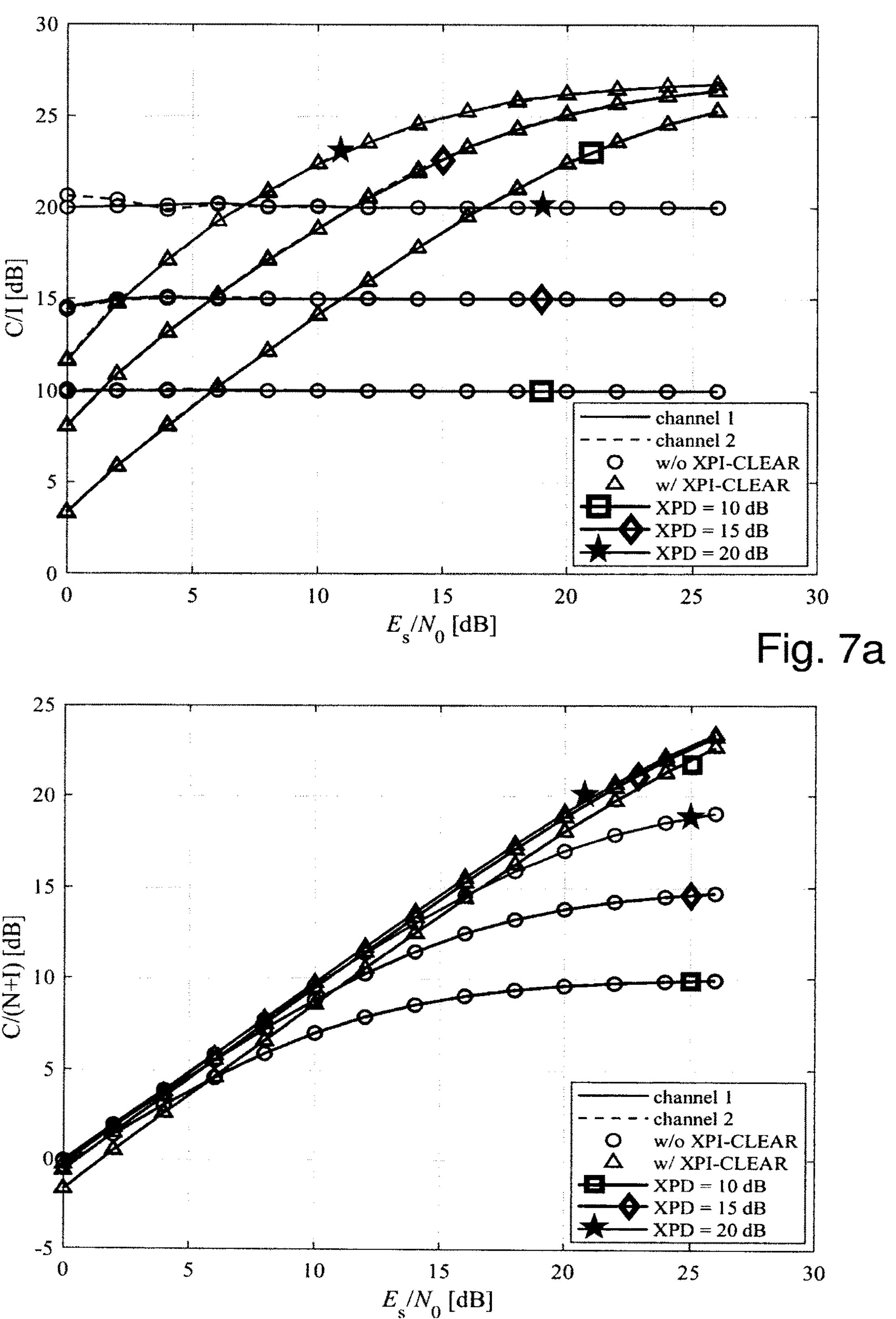

First, the performance of the improved receiver with the XPI-CLEAR method is compared with a standard receiver without XPI-CLEAR for real-valued cross factors and unit impulse responses in the XPI model for XPD values of 10, 15 and 20 dB. The carrier-to-interference ratio C/I and the carrier-to-noise-and-interference ratio C/(N+I) at the received constellation are presented as a function of the ratio between the energy per symbol and the noise power spectral density $E_s/N_0$ in FIG. 7. It should be noted that very similar performance curves resulted from tests with even higher order modulations up to 32-APSK, since the XPI-CLEAR method is agnostic to the used modulation format. In the presented scenario, similar performance is observed on both channels. The degradation of the C/I for $E_s/N_0$ values lower than approximately 6 dB results in only a minor degradation of the C/(N+I), while the improvement of the C/I for $E_s/N_0$ values greater than approximately 6 dB results significant improvement of the C/(N+I). Since the C/(N+I) at the received constellation is the metric which determines the packet-error rate (PER) performance of the receiver, the resulting degradation for C/(N+I) values lower than 5 dB is less than 1 dB for a very low XPD of 10 dB, and negligible for practical XPD values above 15 dB, while the improvements for C/(N+I) values greater than 5 dB are considerable and up to 12.7 dB in the presented scenario. The performance of lower-order modulation such as QPSK is limited by the $E_s/N_0$, and practical C/I values greater than 10 dB, corresponding to an XPD greater than 10 dB, are only a minor issue. For example, since QPSK requires C/(N+I) values from 1 to 6.4 dB for different code rates to meet the PER target, only a minor degradation less than 1 dB for very low XPD of 10 dB is presented, while the degradation for practical XPD values above 15 dB is negligible. Higher order modulation such as 8-PSK, 16-APSK and 32-APSK require C/(N+I) values greater than 5.5, 9 and 12.7 dB, respectively, to meet the PER target, where significant performance improvements are presented. The results justify the suitability of the XPI-CLEAR method for application with ACM. The gains of the C/I at midrange $E_s/N_0$ of 14 dB are 7.8, 7.1 and 4.5 dB for XPD values of 10, 15 and 20 dB, respectively. These increase to 15.3, 11.4 and 6.7 dB at higher $E_s/N_0$ of 26 dB. The gains of the C/(N+I) at midrange $E_s/N_0$ of 14 dB are 3.9, 1.9 and 0.6 dB. These increase to 12.7, 8.5 and 4.3 dB at higher $E_s/N_0$ of 26 dB. For the 4/5-rate 16-APSK modulation scheme which requires a C/(N+I) of 11 dB to meet the PER target, the improved receiver with the XPI-CLEAR method enables the use of this modulation scheme at an XPD of 10 dB, and gains of at least 1.8 dB in terms of the required $E_s/N_0$ are presented for practical XPD values greater than 15 dB.

The performance of the improved receiver with the XPI-CLEAR method is further compared with a standard receiver without XPI-CLEAR for complex-valued cross factors and unit impulse responses in the XPI model for a practical XPD of 15 dB and phase angles of 15, 30 and 45 degrees, in order to evaluate the impact of depolarization due to atmospheric conditions. Here, a phase angle of 45 degrees represents the worst-case value [1]. The C/I ratio and the C/(N+I) ratio at the received constellation are presented as a function of the $E_s/N_0$ ratio in FIG. 8. In the presented scenario, similar performance is observed on both channels. While this setup has no impact on the standard receiver, it shows a dependence of the performance of the XPI-CLEAR method on the phase angle of the cross factor. The gains of the C/I at midrange $E_s/N_0$ of 14 dB are 5.8, 3.7 and 1.8 dB for an XPD of 15 dB and phase angles of 15, 30 and 45 degrees, respectively. These increase to 8.4, 4.8 and 2.3 dB at higher $E_s/N_0$ of 26 dB. The gains of the C/(N+I) at midrange $E_s/N_0$ of 14 dB are 1.7, 1.3 and 0.7 dB. These increase to 6.8, 4.2 and 2.1 dB at higher $E_s/N_0$ of 26 dB. For the 4/5-rate 16-APSK modulation at C/(N+I) of 11 dB, gains of 1.7, 1.4 and 0.9 dB, respectively, in terms of the required $E_s/N_0$ is presented for complex-valued cross factors with the improved receiver with the XPI-CLEAR method.

In addition, the performance of the improved receiver with the XPI-CLEAR method is compared with a standard receiver without XPI-CLEAR for a real-valued cross factor and unit impulse responses in the XPI model for a practical XPD of 15 dB and a DFO with phase increments of 0.06, 0.12 and 0.18 degrees, in order to evaluate the impact of DFO between the samples of the two channels. Here, the vector length of N=500 is considered as the upper value of the inequality $200 \leq N \leq 0.25 \cdot f_s/f_{DFO}$, and so it determines the worst-case value of the phase increment of the DFO as 0.18 degrees for a differential sensitivity between the VCOs in the two channels of $S_{VCO}$=20 ppm and the considered setup parameters. The C/I ratio and the C/(N+I) ratio at the received constellation are presented as a function of the $E_s/N_0$ ratio in FIG. 9. In the presented scenario, similar performance is observed on both channels. While this setup has no impact on the standard receiver, since the DFO is compensated in the synchronization block, it shows a dependence of the performance of the XPI-CLEAR method on the phase increment angle of the DFO. The gains of the C/I at midrange $E_s/N_0$ of 14 dB are 6.7, 5.5 and 4.3 dB for an XPD of 15 dB and a DFO with phase increments of 0.06, 0.12 and 0.18 degrees, respectively. These increase to 10.3, 7.9 and 5.7 dB at higher $E_s/N_0$ of 26 dB. The gains of the C/(N+I) at midrange $E_s/N_0$ of 14 dB are 1.9, 1.7 and 1.4 dB. These increase to 7.9, 6.5 and 4.9 dB at higher $E_s/N_0$ of 26 dB. For the 4/5-rate 16-APSK modulation at C/(N+I) of 11 dB, gains of 1.7, 1.6 and 1.5 dB, respectively, in terms of the required $E_s/N_0$ is presented for a real-valued cross factor and a DFO between the samples of the two channels with the improved receiver with the XPI-CLEAR method.

Figure 1:
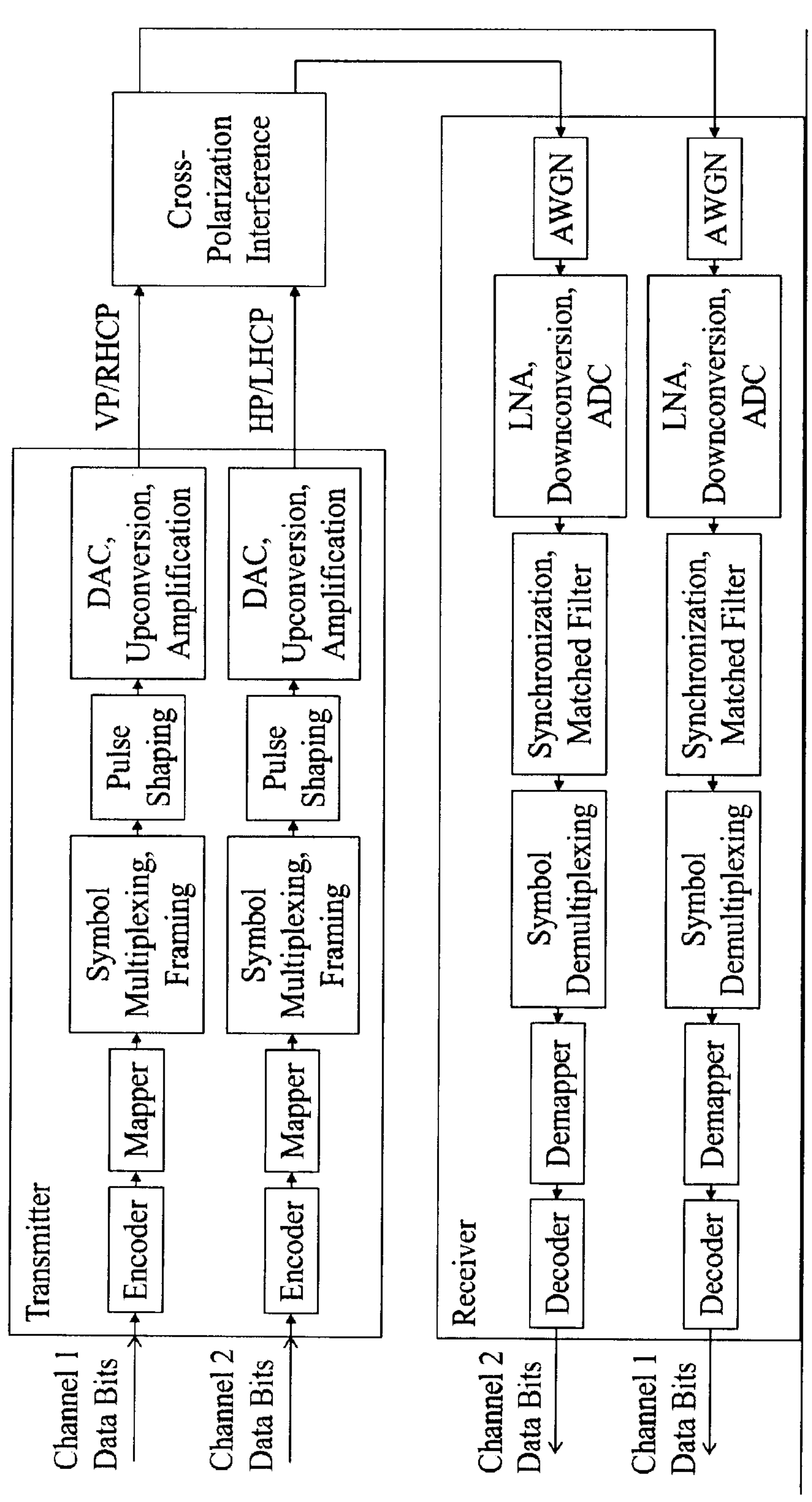
FIG. 1 is a block diagram of a dual-polarization digital communication system with cross-polarization interference.
Figure 2:
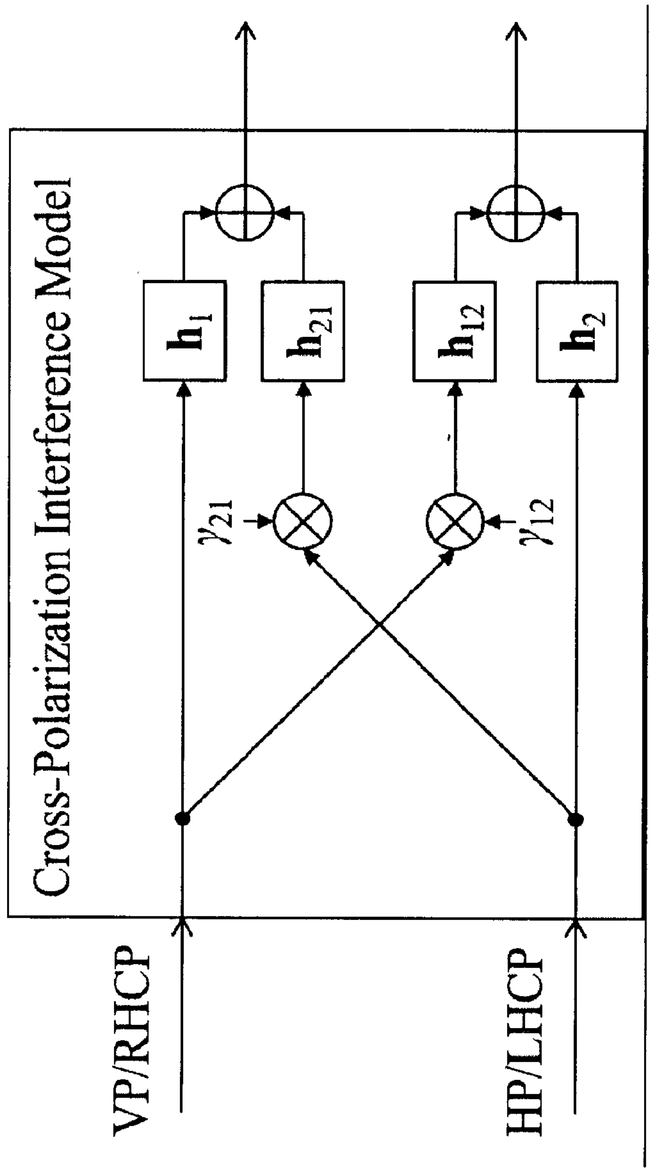
FIG. 2 is a block diagram of the cross-polarization interference model.

The performance of the improved receiver with the XPI-CLEAR method is also compared with a standard receiver without XPI-CLEAR for real-valued cross factors and an example of impulse responses in the XPI model for XPD values of 10, 15 and 20 dB, in order to evaluate the impact of memory effects due to frequency selectivity of the XPD. The impulse responses are modelled as a finite impulse response (FIR) filter with a group delay, and an example of the complex-valued taps are presented in FIG. 10 in accordance with the XPI model from FIG. 2. A non-symmetric setup is chosen, in order to evaluate the performance of the receiver in a scenario where two independent antenna feeds with different impulse responses are used. The C/I ratio and the C/(N+I) ratio at the received constellation are presented as a function of the $E_s/N_0$ ratio in FIG. 11. In the presented scenario, one of the channels is subjected to inferior C/I conditions as compared to the other, and therefore, the performance of both the standard and the improved receivers is different in the two channels. The difference is more pronounced in the C/I ratio at lower $E_s/N_0$, while the difference is diminished at higher $E_s/N_0$. As a result, only a negligible difference is presented in the C/(N+I) ratio. The gains of the C/I at midrange $E_s/N_0$ of 14 dB are 6.5, 4.7 and 2.2 dB for XPD values of 10, 15 and 20 dB, respectively, in one of the channels, while the gains are 6.9, 5.2 and 2.6 dB in the other. These increase to 12.2, 8 and 3.9 dB at higher $E_s/N_0$ of 26 dB in one of the channels, while the gains are 11.5, 7.4 and 3.6 dB in the other. The gains of the C/(N+I) at midrange $E_s/N_0$ of 14 dB are 3.7, 1.7 and 0.5 dB in both channels. These increase to 10.6, 6.5 and 2.9 dB at higher $E_s/N_0$ of 26 dB in both channels. For the 4/5-rate 16-APSK modulation at C/(N+I) of 11 dB, the improved receiver with the XPI-CLEAR method enables the use of this modulation scheme at an XPD of 10 dB, and gains of at least 1.8 dB in terms of the required $E_s/N_0$ are presented for practical XPD values greater than 15 dB and for the given example of FIR impulse responses in the XPI model.

The XPI-CLEAR method according to the invention, and the method for a practical high-speed implementation in an FPGA device as part of an improved receiver device described herein can be applied in all types of RF commercial dual-polarization digital communication systems, where data is transmitted over two channels in a PDM fashion, for example, one channel utilizing VP/RHCP, and another channel utilizing HP/LHCP. Notable examples of such communication systems are satellite communications and terrestrial wireless communications. In addition, it can be applied in the forward as well as in the return link. Having access to the signals on both channels, this non-data-aided and non-decision-directed method adaptively estimates the XPI, and performs XPI cancellation in a transparent fashion. It has a lower complexity as compared to competitive filter-based approaches, and is therefore suitable for higher-rate applications. As shown, the XPI-CLEAR method reduces the XPI, and increases the SNIR at the receiver decoder. As a result, the achievable data rates are improved which can be translated into higher throughput and lower cost per transmitted bit.

REFERENCES

[1] ETSI TR 102 376-2 V1.1.1 (2015 November), User guidelines for the second generation system for Broadcasting, Interactive Services News Gathering and other broadband satellite applications; Part 2: S2 Extensions (DVB-S2X)

[2] Blue book 131.2 from the Council of the Consultative Committee for Space Data Systems (CCSDS), 131.2-B-1 Flexible Advanced Coding and Modulation Scheme for High Rate Telemetry Applications, March 2012.

[3] Calculation of long-term statistics of hydrometeor-induced cross-polarization, The International Telecommunication Union (ITU) recommendation, ITU-R P. 618-13.

[4] L. Rossi, C. Salvaneschi, M. Nava, A. Miletic, Interference Erasing System with Independent Receivers, EP1365519B1, 2005.

[5] J.-P. Millerioux, E. Peragin, H. Guillon, J.-L. Issler, T. Dehaene, P. Bataille, Y. Richard, G. Guillois, J. Batbedat, F. Sepot, G. Richard, Preliminary Definition of a High Performance X-Band Transmitter for Microsatellites, in Proc. of The 4S Symposium 2012, 4-8 June, 2012, Portoroz, Slovenia.

[6] M. Kawai, Cross Polarization Interference Compensation Method, and Cross Polarization Interference Compensating Device, EP1940061A1, 2008.

The invention claimed is:

1. A method for receiving first and second digital signals, comprising first and second independent streams of oversampled and pulse-shaped baseband digital complex-valued samples, in a dual-polarization digital communication system utilizing first and second radio-frequency (RF) polarization channels, comprising receiving the first and second digital signals transmitted via the first and second radio-frequency (RF) polarization channels, wherein each of the first and second received digital signals comprises a stream of oversampled and pulse-shaped baseband digital complex-valued samples, and wherein each of the first and second received digital signals also includes a cross-polarization interference (XPI) component, jointly processing the first and second received digital signals for providing estimation and cancellation of the cross-polarization interference (XPI) components, wherein processing comprises estimation of a cross factor, and wherein processing further comprises estimation of each interfering component by means of the estimated cross factor and subtraction of each estimated interfering component from the corresponding received signal, wherein the processing further comprises buffering the received samples of the first and second channels, in order to construct first and second vectors of consecutive samples of the first and second digital signals, respectively, having the equal even-number length (N), wherein the length (N) is the number of consecutive samples, wherein the step of estimation of the cross factor further comprises inputting the oversampling factor used during sampling of the first and second received signals, and using it to compute the sampling correction factor by means of interpolation or extrapolation with a look-up table (LUT sampling) in Table 1 of the specification, wherein the step of estimation of the cross factor further comprises the following steps:

computing the dot product between the elements of the first vector and the complex conjugate of the elements of the second vector, and normalizing the result by the even-number length (N) of the first vector, using the first vector to compute the dot product between the elements with an odd index and the complex conjugate of the elements with an even index, and normalizing the result by one-half of the even-number length (N), using the second vector to compute the dot product between the elements with an odd index and the complex conjugate of the elements with an even index, and normalizing the result by one-half of the even-number length (N), taking the real value of the results of the latter two dot product operations, involving the odd and even elements of each vector, multiplying each of them by the sampling correction factor, and adding the results together, computing the reciprocal value of the result of the latter addition by means of a look-up table (LUT reciprocal) of the reciprocal function, wherein the reciprocal function is defined as 1 divided by the argument of the function, and multiplying it with the result of the first dot product operation, involving the elements of the first and second vectors, taking the real and imaginary values of the result of the latter multiplication, applying a look-up table (LUT function) for the function in equation (3) of the specification on each of them, and respectively combining the two results to form a complex-valued number, being the estimate of the cross factor.

2. The method according to claim 1, wherein the method is applicable in a dual-channel receiver device for any digital communication system both for forward and return links.

3. The method according to claim 1, wherein the step of estimation of each cross-polarization interference component and its subtraction of the received signal comprises the following steps:

multiplying the estimate of the cross factor with the samples of the second vector, and elementwise subtracting the result from the samples of the first vector, producing improved received samples of the first channel, multiplying the conjugated estimate of the cross factor with the samples of the first vector, and elementwise subtracting the result from the samples of the second vector, producing improved received samples of the second channel.

4. A method for receiving first and second digital signals, comprising first and second independent streams of oversampled and pulse-shaped baseband digital complex-valued samples, in a dual-polarization digital communication system utilizing first and second radio-frequency (RF) polarization channels, comprising receiving the first and second digital signals transmitted via the first and second radio-frequency (RF) polarization channels, wherein each of the first and second received digital signals comprises a stream of oversampled and pulse-shaped baseband digital complex-valued samples, and wherein each of the first and second received digital signals also includes a cross-polarization interference (XPI) component, jointly processing the first and second received digital signals for providing estimation and cancellation of the cross-polarization interference (XPI) components, wherein processing comprises estimation of a cross factor, and wherein processing further comprises estimation of each interfering component by means of the estimated cross factor and subtraction of each estimated interfering component from the corresponding received signal, wherein the processing step further comprises the following clock signals:

a main clock signal, determining the fundamental frequency of the processing, an odd clock signal, being half the frequency of the main clock signal, having its rising edge synchronous with the rising edge of the main clock signal, and an even clock signal, being a shifted version of the odd clock signal, having its rising edge synchronous with the falling edge of the main clock signal, and wherein the processing step further comprises sequentially inputting the received samples of the first and second channels into first and second shift registers with equal even-number length (const_length_of_reg_1), wherein each shift register comprises delay elements, wherein the length (const_length_of_reg_1) is the number of delay elements, and wherein the shift registers are driven by the main clock signal, wherein the step of estimation of the cross factor further comprises inputting the oversampling factor used during sampling of the two received signals, and using it to compute the sampling correction factor by means of interpolation or extrapolation with a look-up table (LUT sampling) in Table 1 of the specification, and wherein the step of estimation of the cross factor further comprises the following steps:

multiplying the output of the first delay element of the first shift register with the complex conjugate of the output of the first delay element of the second shift register, multiplying the output of the last delay element of the first shift register with the complex conjugate of the output of the last delay element of the second shift register, subtracting the result of the latter multiplication from the result of the former multiplication, adding the result to the output of a first single-element shift register, serving as an accumulator, being driven by the main clock signal, and having the result input to the first single-element shift register, sequentially feeding the received samples of the first channel into a first half-length shift register with length of half the value of the even-number length (const_length_of_reg_1) of the first shift register, wherein the first half-length shift register is driven by the odd clock signal, and sequentially feeding the received samples of the first channel into a second half-length shift register with length of half the value of the even-number length (const_length_of_reg_1) of the first shift register, wherein the second half-length shift register is driven by the even clock signal, multiplying the output of the first delay element of the first half-length shift register with the complex conjugate of the output of the first delay element of the second half-length shift register, multiplying the output of the last delay element of the first half-length shift register with the complex conjugate of the output of the last delay element of the second half-length shift register, subtracting the result of the latter multiplication from the result of the former multiplication, adding the result to the output of a second single-element shift register, serving as an accumulator, being driven by the even clock signal, and having the result input to the second single-element shift register, sequentially feeding the received samples of the second channel into a third half-length shift register with length of half the value of the even-number length (const_length_of_reg_1) of the first shift register, wherein the third half-length shift register is driven by the odd clock signal, and sequentially feeding the received samples of the second channel into a forth half-length shift register with length of half the value of the even-number length (const_length_of_reg_1) of the first shift register, wherein the forth half-length shift register is driven by the even clock signal, multiplying the output of the first delay element of the third half-length shift register with the complex conjugate of the output of the first delay element of the forth half-length shift register, multiplying the output of the last delay element of the third half-length shift register with the complex conjugate of the output of the last delay element of the forth half-length shift register, subtracting the result of the latter multiplication from the result of the former multiplication, adding the result to the output of a third single-element shift register, serving as an accumulator, being driven by the even clock signal, and having the result input to the third single-element shift register, taking the real values of the outputs of the second and third single-element shift registers, multiplying each of them with the sampling correction factor and with the constant (const_acc_auto) from the following equation:

$$\text{const\_acc\_auto} = 2/(\text{const\_length\_of\_reg\_1} - 2),$$

and adding the two results together, computing the reciprocal value of the result of the latter addition by means of a look-up table (LUT reciprocal) of the reciprocal function, wherein the reciprocal function is defined as 1 divided by the argument of the function, and multiplying it with the output of the first single-element shift register and with the constant (const_acc_cross) from the following equation:

$$\text{const\_acc\_cross} = 1/(\text{const\_length\_of\_reg\_1} - 1),$$

taking the real and imaginary values of the result of the latter multiplication, applying a look-up table (LUT function) for the function in the following equation:

$$f(x) = \text{Real}\left\{\frac{1 - \sqrt{1 - 4x^2}}{2x}\right\}$$

on each of them, and respectively combining the two results to form a complex-valued number, being the estimate of the cross factor.

5. The method according to claim 4, wherein the processing step further comprises initializing all shift registers with zeros at the start of the execution.

6. The method according to claim 4, wherein the step of estimation of each cross-polarization interference component and its subtraction of the received signal further comprises the following steps:

multiplying the estimate of the cross factor with the output of the last delay element of the second shift register, and subtracting the result from the output of the last delay element of the first shift register, producing an improved received sample of the first channel, multiplying the conjugated estimate of the cross factor with the output of the last delay element of the first shift register, and subtracting the result from the output of the last delay element of the second shift register, producing an improved received sample of the second channel.

7. The method according to claim 6, wherein the processing step further comprises sequentially outputting the improved received samples for the first and second channel, wherein the validity of the improved received samples is determined by a binary output-valid signal, wherein the output-valid signal is initialized as zero, and is set to one, once a counter signal, driven by the main clock signal and initialized as zero reaches a value equal to the even-number length of the first shift register.

8. The method according to claim 4, wherein the method is applicable in a dual-channel receiver device for any digital communication system both for forward and return links.

* * * * *